United States Patent [19]

Shepherd

[11] 4,208,364

[45] Jun. 17, 1980

[54] PROCESS FOR THE PRODUCTION OF CONTACT LENSES

[76] Inventor: Thomas H. Shepherd, 12 N. Greenwood Ave., Hopewell, N.J. 08525

[21] Appl. No.: 914,421

[22] Filed: Jun. 12, 1978

Related U.S. Application Data

[62] Division of Ser. No. 670,031, Mar. 24, 1976, Pat. No. 4,121,896.

[51] Int. Cl.$^2$ .............................................. B29D 11/00
[52] U.S. Cl. ...................................... 264/1; 264/313; 351/160 R; 351/160 H
[58] Field of Search .................... 264/1, 313; 425/808; 351/160 R, 160 H

[56] References Cited

U.S. PATENT DOCUMENTS

| | | | |
|---|---|---|---|
| 3,056,166 | 10/1962 | Weinberg | 264/1 |
| 3,212,097 | 10/1965 | Adler | 351/160 |
| 3,337,659 | 8/1967 | Grandperret | 264/1 |
| 3,422,168 | 1/1969 | Bowser | 264/1 |
| 3,660,545 | 5/1972 | Wichterle | 264/1 |
| 3,691,263 | 9/1972 | Stoy et al. | 351/160 H |
| 3,761,208 | 9/1973 | Boudet et al. | 425/352 |
| 3,835,588 | 9/1974 | Whitham | 351/160 R |
| 3,871,803 | 3/1975 | Beattie | 249/82 |
| 3,881,683 | 5/1975 | Whitney | 249/154 |
| 3,915,609 | 10/1975 | Robinson | 264/1 |
| 4,103,992 | 8/1978 | Breger et al. | 351/160 R |

Primary Examiner—James B. Lowe
Attorney, Agent, or Firm—Cushman, Darby & Cushman

[57] ABSTRACT

There is provided a mold comprising a male and a female mold member fabricated from thermoplastic polymeric materials which, in very thin sections are flexible under polymerization conditions, but, under said conditions are sufficiently inflexible in thick sections to retain their shape and surface characteristics. Said mold is provided, on either the male or the female member with a thin rim which, during the polymerization process, flexes and permits the mold members to approach each other and compensate for the shrinkage that occurs during polymerization. Said thin rim further forms the edge of the finished lens.

17 Claims, 7 Drawing Figures

PROCESS FOR THE PRODUCTION OF CONTACT LENSES

CROSS-REFERENCE TO RELATED APPLICATIONS

This is a division of my application Ser. No. 670,031, filed March 24, 1976, now U.S. Pat. No. 4,121,896.

FIELD OF THE INVENTION

Production of contact lenses by casting processes.

BACKGROUND OF THE INVENTION

The primary problem to overcome in utilizing a closed mold system for casting of objects such as contact lenses where surface appearance, edge regularity and surface finish are important is the compensation for the inevitable shrinkage that occurs on polymerization. With most monomeric materials the volumetric shrinkage on polymerization is in the range of 12 to 22%. This shrinkage has heretofore prevented satisfactory casting of objects such as contact lenses from vinyl monomers such as acrylate and methacrylate esters, vinyl pyrollidone, substituted or unsubstituted acrylamides or methacrylamides and the like. For example, as taught in U.S. Pat. No. 3,660,545 (col 1 & 2) a polymerizing acrylate, or methacrylate ester mixture held in a closed glass mold invariably would pull away from at least one mold surface and cause the formation of surface voids which rendered the cast object unsuitable as a lens.

In a further prior art method, (see U.S. Pat. No. 3,660,545) the polymerizing mixture was held between concave and convex glass mold members having an annular gap interposed between them which decreased as polymerization occurred, but again an irregular edge configuration resulted from polymerization shrinkage. This edge portion could be removed by cutting but this resulted in the edge of appreciable thickness which tended to catch the eyelid during movement of the latter, and caused displacement of the lens.

These difficulties with shrinkage compensation therefore have heretofore precluded lens production by casting in closed mold systems and other methods of producing contact lenses of crosslinked polymeric materials such as spin casting and machining and polishing have been employed.

In the spin casting process as taught in U.S. Pat. No. 3,408,429 and U.S. Pat. No. 3,496,254 the polymerizing mixture is contained in a rotating open mold having a concave surface. The anterior, convex surface of the lens is thus formed by the mold surface, and the posterior, concave surface of the lens is formed as a result of centrifugal forces, surface tension of the polymerizing mixture and other factors such as the size and shape of the mold, the volume of the polymerizing mixture, the condition of the mold surface, etc. The concave surface of the lens thus formed is approximately parabolic in shape and many factors must be carefully controlled to produce reproducible shapes. Lenses produced by spin casting usually require post-polymerization edge finishing and optical quality is not of the highest since there is no truly spherical optical zone due to the aspheric nature of the posterior surface.

Most manufacturers of contact lenses of crosslinked polymeric materials use a traditional machining or mechanically working and polishing of lens blanks as taught in U.S. Pat. No. 3,361,858. This method has the advantage of being able to "tailor make" lens curvatures and powers to any desired degree and to furnish high optical quality. The method suffers from the disadvantage of requiring highly skilled artisans for quality production.

It is the object of this invention to provide a method for producing cast lenses in a closed mold system, such lenses having the desirable optical and fitting characteristics of machined and polished lenses.

SUMMARY OF THE INVENTION

The invention comprises a novel form of casting mold and the mode of utilizing same to produce contact lenses. The mold comprises a male portion, a female portion, and a flexible rim portion. The male portion comprises a molding surface, and, in the preferred embodiments a substantially cylindrical support segment wherein said molding surface is attached circumferentially around the lower circumference of the support segment. The molding surface has a pre-determined curvature which will provide one of the surfaces of the contact lens.

The female portion similarly comprises a second molding surface and, in the preferred embodiments, a hollow cylindrical support portion. The inner diameter of said cylinder is substantially equivalent to the external diameter of the support portion of the male segment, the female segment, however, having a diameter just slightly greater than that of the male segment. The diameters are pre-determined so that there is sufficient clearance for the male segment to fit into the female segment and to permit excess monomer or other material used in the process to flow out between the two segments. The clearance, however, should not be so great as to permit the axis of the two segments to be non-aligned to a degree which would adversely affect the optical centering of the lens to be produced.

In the preferred embodiments one end of the said female portion is closed with said second molding surface of pre-determined curvature, said molding surface providing the second surface of the contact lens to be produced.

The flexible rim portion is integrally attached to the molding surface of either the male portion or the female portion in such a manner that it is a coaxial therewith.

The mold surfaces are so arranged that one is a concave and the other is a convex. As will be seen hereinbelow all combinations which are concave and convex curvature together with the rim portion being attached to either, are within the scope of the present invention.

BRIEF DESCRIPTION OF THE DRAWINGS

FIG. 1 shows a convex male molding surface with the flexible rim attached thereto and a concave female molding surface.

FIG. 2 shows a concave male molding surface and a convex female molding surface with the flexible rim attached to the female surface.

FIG. 3 is similar to FIG. 2 except that the flexible rim is attached to the male portion.

FIG. 4 is an alternate embodiment of FIG. 3.

FIG. 5 is similar to FIG. 1 except that the flexible rim portion is attached to the female molding surface.

FIG. 6 shows a simplified version of the embodiment of FIG. 1.

Figure 1:
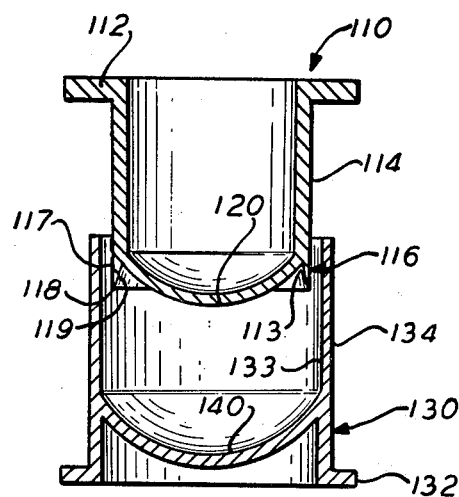
FIGS. 1 through 6 are exploded sectional elevations of the embodiments of the present invention.

In all of the figures the last two digit numbers represent equivalent items numbered with three digits where the last two digits are the same. Thus, Item 110, Item 210, Item 310, and Item 410 all represent the male molding portion.

In the more detailed discussion of the most preferred embodiment below only FIG. 1 will be discussed, and the discussion relating thereto is equally applicable to the embodiments of all of the other figures.

DESCRIPTION OF THE PREFERRED EMBODIMENT

The mold comprises two portions, namely a male portion 110 and a female portion 130. The male portion, in the preferred embodiments, comprises a substantially cylindrical support segment 114 having, optionally, attached to the upper end thereof a rim 112. In the preferred embodiment, because of savings in mold materials, said cylindrical portion 114 is, as shown, hollow: however, the invention should not be considered as being limited thereto. Support member 114 is closed by molding surface 120 circumferentially attached to the bottom of cylinder 114. The curvature of 120 is pre-determined to comply with the optical requirements of the lens to be produced. The curvature may be entirely spherical or aspherical or combinations of both. Further, the surface may be toric in the central or optical zone; however, the peripheral portion must be symmetrical in respect to the central axis of the lens in order to achieve proper seating or mating with the rim to be discussed herein below. In the modification of FIG. 1 a flexible circumferential ring 116 is located around the molding surface integral therewith. Said ring 116 comprises an outer surface 117, an inner surface 119, and a contact edge 118.

The female portion 130 comprises, in the preferred embodiments, a cylindrical support member 134 set, optionally, in a base 132 set circumferentially thereto and a molding surface 140 set internally in cylinder 134. As with respect to male molding surface 120 the curvature of female molding surface 140 is pre-determined and may vary in the same manner as the curvature of mold surface 120. The only limitation placed upon the mutual relationship of curvature of surfaces 120 and 140, which will be discussed in greater detail herein below, is that the article to be molded therebetween shall have the general characteristics suitable for a contact lens, namely that the article produced thereby shall have a concave surface which will contact, when in use, the eyeball of the wearer and a second, convex surface, which shall contact the internal portion of the eyelid of the wearer.

During the operation of the process which will be discussed in greater detail herein below, the material which will constitute the contact lens is placed in the female portion of the mold. The male portion placed into the female portion in such a manner that tip 118 of the rim in this case attached circumferentially around the male molding surface 120 just touches the surface 140 of the female molding surface. At this point excess molding material is squeezed out between the outer edge of cylindrical support means 114 and the inner edge of cylindrical support means 133. In the embodiment shown in the figures no runoff channels in said cylindrical portions are shown or provided. Nevertheless, the provision of molds having such channels is to be considered in the scope of the present invention. They are not utilized in the preferred embodiments since the provision of such molds requires an additional, and more expensive, step in manufacturing the molds and provision thereof has not been found to be needed.

The drawings herein are not to scale, in particular, with regard to the rim segments—say 116, and the clearance between, say 114 and 133.

The two parts of the mold containing the molding material are then subjected to the molding processes which are discussed in detail herein below. During the molding stage, the molding material will contract, this contraction may be as much as 20% of the volume of the molding material originally present between surfaces 119, 120, and 140. Since such a contraction takes place in a totally enclosed space, a potential vacuum is formed which will be counteracted by external atmospheric pressure causing the two molds 110 and 130 to move towards each other. The flexibility of rim 116 permits the molds to thus approach each other more closely due to the flexing of rim 116 in a uniform manner. If desired, external pressure can be applied to ensure that the molding surfaces do approach each other as closely as possible. However, the application of such external pressure is optional and, while in certain cases, may give rise to improved results the operation of the processes will proceed without said external pressure. Upon completion of the molding step, the molds are separated and the lens produced stripped out from the mold in a condition ready to use except for cleaning and polishing of the edges. The optical surfaces—that is to say, the contact surfaces—are in their desired state.

Figure 5:
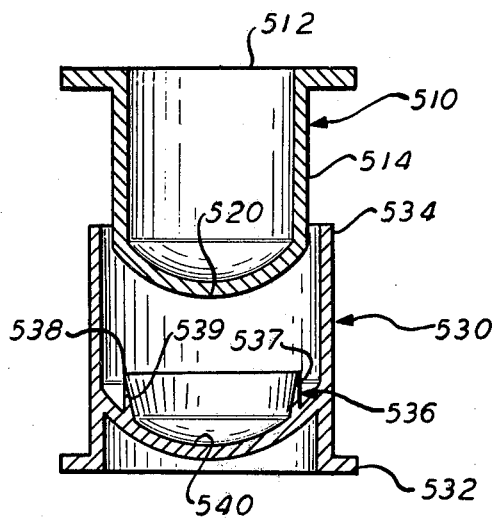

As stated herein before, the set of molds shown in FIG. 1 is the most preferred embodiment, in that it is the simplest of the preferred embodiments in the present invention to manufacture. Nevertheless, as stated hereinabove, the invention is in no way limited to this embodiment. FIG. 5 shows a variation of FIG. 1 wherein the rim herein 536 is integral with female molding surface 540. In this modification as in that of FIG. 1 the male surface is convex and the female surface is concave. The upper edge 538 of ring 536 contacts male molding surface 520 and the surfaces enclosing the lens creating molded material are defined by the surfaces between the point on surface 520 contacted by edge 538, and by internal surface 539 of edge 536 together with the internal portion of molding surface 540. The operation of the process is similar to that described generally with respect to FIG. 1 and in more detail herein below.

Figure 2:
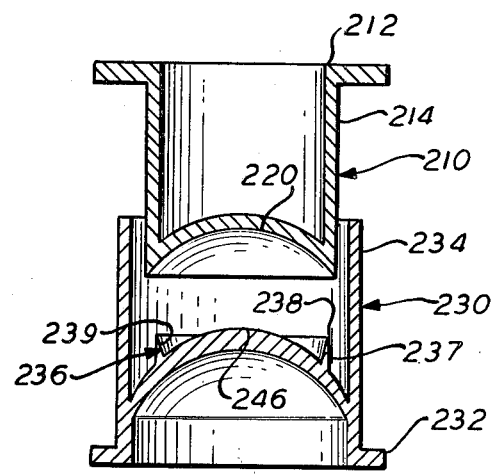

FIG. 2 shows yet another embodiment of the invention wherein the edge ring 236 is attached to female molding surface 240. In this modification, however, the female molding surface 240 is convex and therefore, the male molding surface 220 is concave. In other respects the operation of the process and the mutual relationship of its component parts are as before.

Figure 3:
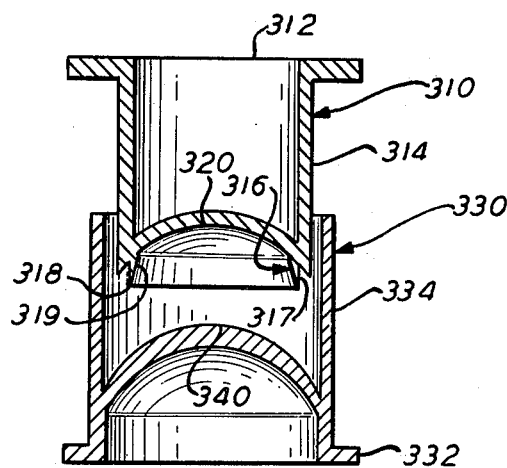

FIG. 3 shows a modification of the embodiment of FIG. 2 wherein the flexible ring portion 316 is attached to the male, concave portion 320 rather than the female, convex molding surface 340.

Figure 4:
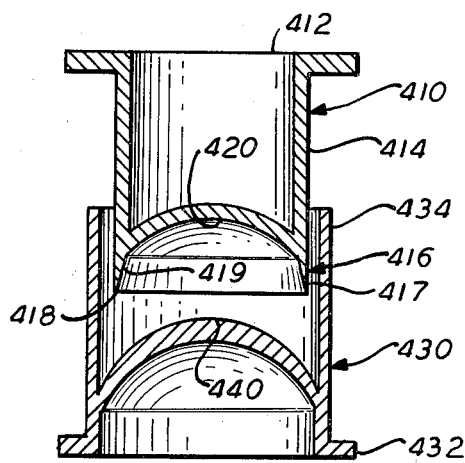

In the modification of FIG. 4 a variation of the embodiment of FIG. 3 is presented wherein the flexible edge ring 416 is actually located on the edge of molding surface 420 rather than internally as shown in the modification of FIG. 3.

Figure 6:
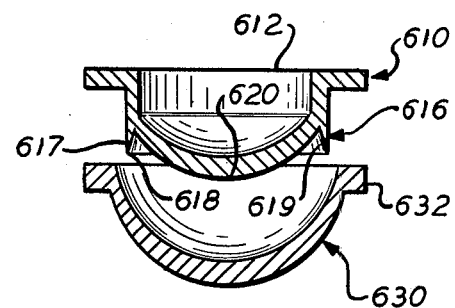

In the simplified embodiment of FIG. 1 above, in FIG. 6 the cylindrical support member 14 of the male portion and the cylindrical support member 34 of the female portion are eliminated so that the mold surfaces 620 and 640 are set directly into each other. While this modification is operative and illustrates basic features of the invention, the modifications additionally including the cylindrical support means are preferred in view of their additional handling stability.

The advance in the art represented by the present invention depends upon the interaction of several factors, one of which is the form of the mold set forth herein and above. The other factors are the nature of the materials utilized to construct the mold. The material utilized for the construction of the mold must, under the conditions utilized in the molding procedure be sufficiently rigid to preserve the pre-determined curvatures of the molding surfaces. Yet, when forced in a thin ring such as ring 116, be flexible enough to permit the contraction of the molding volume mentioned herein above.

It has been found that suitable materials for construction of the molds are thermoplastic resins which are inert to the polymerizing media, which have the requisite flexibility under polymerization conditions, which do not strongly adhere to the polymerized species and which can be molded to an optical quality surface. Especially suitable materials include polyolefins such as low, medium, and high density polyethylene, polypropylene, propylene copolymers known as polyallomers, polybutene-1, poly-4-methylpentene-1, ethylene vinyl acetate and ethylene vinyl alcohol copolymers, and ethylene copolymers such as polyionomers. Other suitable materials are polyacetal resins and acetal copolymer resins, polyarylethers, polyphenylene sulfides, polyaryl sulfones, polyarylether sulfones, Nylon 6, Nylon 66 and Nylon 11, thermoplastic polyesters and various fluorinated materials such as fluorinated ethylene-propylene copolymers and ethylenefluoroethylene copolymers.

The choice of a particular thermoplastic material for use in fabrication of molds is governed by polymerization conditions to be used. In general, a guide is the heat distortion temperature at 66 psi fiber stress (ASTM D648) of the plastic material. Thermoplastic molds are generally operable in this invention at temperatures ranging from 20° to 40° C. below the heat distortion temperature up to a few degrees, suitably 10°, above the heat distortion temperature.

For example, low density polyethylene shows a heat distortion temperature of 40°–50° C., and acceptable results under light loading are obtained with this material at polymerization temperatures of from 30° to about 70° C. Above 70° C., some distortion of optical surfaces may occur.

Whereas, with polypropylene, which has a heat distortion temperature in the range of 100° to 120° C., with little or no applied pressure, acceptable results are obtained at polymerization temperatures from about 65° to 120° C. Below 65° C., flexibility of the plastic rim is not sufficient to compensate for shrinkage, and above 120° C., distortion of optics occurs.

High polymerization temperatures may be used for materials such as nylons, polyphenylene sulfides, polysulfones and fluorinated polymers showing higher heat distortion temperatures.

In addition, it is possible to operate at lower polymerization temperatures by increasing the "load" or mold closing pressure applied. For example, shrink marks or surface voids are likely to appear in cast lenses made with the polypropylene molds of this invention at a polymerization temperature of below 65° C. at light closing pressure applied to the mold; however, if the closing pressure is increased to, for example, 10 psi, (calculated on the total mold area) lenses free from surface blemishes are obtained. Thus the requisite flexibility of the mold rim may be obtained through a combination of polymerization temperature and closing pressure.

Figure 7:
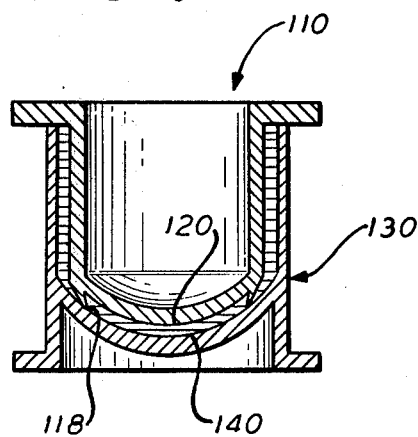
FIG. 7 shows a compressed view of FIG. 1 wherein the rim is shown in flexed form.

It is noted that the male mold member, say 110 has the rim 116 integrally formed at the periphery of the male molding surface 120. The junction of the base of the rim 116 with the surface 120 forms the posterior portion of the edge of the lens, while the mating line 118 of the rim with the female mold member 140 forms the anterior shape of the edge. The overall thickness of the edge thus formed is the "height" of the rim 116—i.e., outer edge 118 to inner edge 113—less the distance the rim flexes to compensate for the shrinkage that occurs on polymerization. Depending on the edge thickness desired, the height of the rim 116 may vary from about 0.05 mm for a very thin edge, to as much as 0.3 mm for a rather thick, rounded edge. In a typical example, the height of the rim 116 from the edge 118 to edge 113 of the curve is 0.10 mm. If a polymerizing mixture which has a volumetric shrinkage of 20% is employed, then the rim must flex sufficiently to allow the thickness of the edge to contract to 0.08 mm. This flexing takes place generally by an inward bending as illustrated in FIG. 7. Similar flexing occurs in the embodiments of FIGS. 2–6.

It is desirable that the apex of the rim be as thin as possible to minimize the irregularity of the "mating or parting line". In practice, the thickness of the apex of the rim is held below 0.04 mm, and preferably below 0.01 mm. The rim is very delicate and the male mold member must be handled with care to avoid damage.

The outside diameter of the male mold half must be sufficiently smaller than that of the female half to permit escape of excess of the material to be polymerized upon closing the mold. Tapering of the male and female halves aids in removal of excess material but is not critical. In general, the male half is preferably from 0.1 to 0.3 mm smaller in the diameter than the female half. If the size difference is too great, for example 0.5 mm, then alignment of the optical centers of the two mold halves becomes problematic, although the invention is still operable.

In the practice of this invention, metal molds, designated to produce the desired male and female thermoplastic molds are fabricated by traditional machining and polishing operations. These metal molds are then used in injection or compression molding machines to produce a plurality of thermoplastic molds which in turn are used to cast the desired lenses from polymerizable or vulcanizable mixtures. Thus, a set of metal molds can yield a large number of thermoplastic molds which, in turn, yield an even larger number of lenses since the thermoplastic molds may be reused if handled with care. This constitutes a considerable saving over the traditional method of machining and polishing individual lenses, since the machining and polishing operations are carried out only on the original metal molds.

The design of the lenses produced by this invention is not restricted to any particular set of parameters. Both anterior and posterior surfaces of the lenses may consist of entirely spherical curves or aspherical curves or combinations of both. For example, the central portion of the lens may consist of spherical curves on both the anterior and posterior surface, and the periphery of the anterior surface may consist of a steeper or flatter spherical curve, and the periphery of the posterior surface may be aspheric to achieve improved fitting characteristics.

In addition, one or both of the surfaces may be toric in the central or optical zone; however, the peripheral portion must be symmetrical with respect to the central axis of the lens to achieve proper seating or mating of the integral rim.

Monomer, prepolymer or vulcanizable mixtures particularly useful in the practice of this invention include hydrophobic acrylic ester, suitably lower alkyl acrylic esters, the alkyl moiety containing 1-5 carbon atoms, such as methyl acrylate or methacrylate, ethyl acrylate, or methacrylate, n-propyl acrylate or methacrylate, isopropyl acrylate, or methacrylate, isobutyl acrylate or methacrylate, n-butyl acrylate or methacrylate, or various mixtures of these monomers. For increased dimensional stability and resistance to warpage the above monomers or monomer mixtures may be further admixed with a minor proportion of di or polyfunctional polymerizable specie to cause cross linking of the polymeric matrix as polymerization proceeds. Examples of such di- or polyfunctional species include: divinyl benzene, ethylene diacrylate or methacrylate, propylene glycol diacrylate or methacrylate and acrylate or methacrylate esters of the following polyols, triethanol amine, glycerol, pentaerythritol, butylene glycol, diethylene glycol, triethylene glycol, tetraethylene glycol, mannitol, sorbitol and the like. Other cross linking monomers may include N, N-methylene-bis-acrylamide or methacrylamide, sulfonated divinyl benzene, and divinyl sulfone.

Further, the above monomers or mixtures thereof may be further mixed with linear polymeric species which are soluble therein as long as the viscosity of the solution or "casting syrup" formed thereby does not become sufficiently great that difficulty in removing bubbles therefrom is encountered.

Other monomeric materials suitable for producing lenses via this invention are hydrophilic monomer mixtures forming three dimensional cross linked networks such as those disclosed in U.S. Pat. No. 3,822,089. In addition to the hydrophilic acrylic monomers disclosed in the aforementioned patent, useful materials include mono or di N-alkyl substituted acrylamides or methacrylamides, N-vinyl pyrrolidone, alkyl ether acrylates and methacrylates, and vulcanizable silicon fluids or elastomers. The alkyl moieties are suitable lower alkyl groups of 1-5 carbon atoms.

With the hydrophilic monomer or mixtures thereof, it is essential that a 3-dimensional cross linked network be formed since the polymerized materials absorb water and become soft and flexible and would lack shape retention if not cross linked. Suitable cross linking monomers are those listed above for the hydrophobic acrylic esters.

Polymerization of monomer mixtures is usually carried out with free radical catalysts of the type in common use in vinyl polymerization. Such catalyst species include organic peroxides, percarbonates, hydrogen peroxides, and inorganic materials such as ammonium, sodium, or potassium persulfate. Polymerization using such catalysts may occur at temperatures between ambient temperature—i.e., ca 20° C. and about 120° C.—depending on the speed of polymerization desired.

Polymerization may also occur between monomer or prepolymer mixtures under the influence of elevated temperatures or radiation (U.V., X-ray, or radioactive decay).

With silicone elastomers, vulcanization may take place via a free radical curing mechanism, or, in the case of two part so called RTV compounds vulcanization may occur through displacement or condensation reactions.

The following examples serve to further illustrate the invention.

EXAMPLE 1(a) Formation of Molds

Female high density polyethylene molds were prepared by injection molding on a convex male steel mold having an outside diameter of 12.0 mm, a central radius of curvature of 7.50 mm with a chord diameter of 10.0 mm and a peripherical radius of curvature of 7.00 mm. Male high density polyethylene molds were prepared by injection molding in a concave steel mold having an inside diameter of 11.9 mm, central radius of 7.00 mm with a chord diameter of 11.0 mm, and a peripheral curve having a radius of 12.5 mm. The periphery of the curved mold surface was recessed to provide a peripheral rim 0.01 mm wide at the apex extending 0.12 mm from the edge of the curve. Radiuscope measurement showed the central radius of curvature of the female concave molds to be 7.43±0.04 mm and the inside diameter measured 12.1 mm. The outside diameter of the male molds was 11.8 mm, and the central radius of curvature was 6.95±0.03 mm.

EXAMPLE 1(b) Formation of Lens

Ten concave female molds were placed on a flat surface with the cavity projecting upward. A solution consisting of carefully purified 2-hydroxyethyl methacrylate, 100 parts; distilled water, 30 parts; ethylene glycol dimethyl ether, 25 parts; triethylene glycol dimethacrylate, 0.4 parts; and di-isopropyl percarbonate, 0.2 parts; was prepared by thorough mixing. One-half ml. of the solution was placed in the female mold, and the male mold halves were slowly inserted to displace excess solution and to displace any bubbles. Slight pressure was applied on the male halves to ensure seating of the rim. The filled molds were then placed in a circulating air oven at 45° C. for 1½ hours. After cooling to room temperature, the molds were opened, the "ring" of polymerized material filling the cylindrical void in the annulus between the mold halves was removed, and the flexible lenses which adhered lightly to the male half of the mold were carefully peeled off. After soaking in physiological saline to leach the ethylene glycol dimethyl ether from the lenses, the lenses were examined.

The edges were smooth and evenly formed, requiring no further treatment, and the surfaces were smooth and unblemished. The lenses had a center thickness of 0.19±0.02 mm, optical powers of −2.50 to −2.75 diopters, and diameter of 12.0 mm.

EXAMPLE 1(c) Formation of lens

A solution consisting of purified 2-hydroxy-ethyl methacrylate, 55 parts; N,N-dimethyl acrylamide, 45 parts; water, 30 parts; diethylene glycol dimethyl ether, 20 parts; methylene-bis acrylamide, 0.3 parts; and diisopropyl percarbonate, 0.3 parts; was cast in the molds of Example 1(a), in a manner identical to that of Example 1(b).

Unblemished lenses having a center thickness of 0.21±0.03 mm, edge thickness of 0.10±0.02 mm, diameter of 13.0 mm, and optical powers of from −2.25 to −2.50 diopters were obtained after equilibration in 0.9% saline solution. The larger size and somewhat lower optical power of these lenses over those of Example 1 is caused by the higher swelling coefficient of this polymer composition in water.

EXAMPLE 2(a) Formation of Molds

Female molds were prepared using an ethylene-vinyl acetate copolymer (having a 10% vinyl acetate content) by injection molding on a convex male steel mold having an outside diameter of 8.3 mm, central radius of curvature of 8.60 mm at a chord diameter of 6.5 mm and a peripheral radius of curvature of 7.55 mm. Male molds were produced from the same copolymer by injection molding in a female steel cavity having a central concave radius of curvature of 7.50 mm with a chord diameter of 7.8 mm and a peripheral radius of curvature of 9.50 mm. The periphery of the concave mold was recessed to provide a rim on the molded part protruding 0.1 mm from the edge of the curved surface with an apex thickness of 0.015 mm. The inside diameter of the concave steel mold was 8.0 mm.

The inside diameter of the injection molded female cavities was 8.2 to 8.4 mm and the central radius of curvature was 8.55±0.05 mm. The outside diameter of the male convex plastic molds was 7.0 mm and the central radius of curvature was 7.45±0.03 mm.

EXAMPLE 2(b) Formation of Lenses

A solution consisting of methyl methacrylate, 98 parts; ethylene dimethacrylate, 20 parts; and di-t-butylcyclohexylperoxy dicarbonate, 0.3 parts; was prepared, and 0.3 ml of the solution was introduced into each of 10 of the upward facing concave female molds. The male molds were slowly lowered into cavities to displace air and excess monomer mixture. The male molds were pressed lightly to ensure seating of the rim on the concave female mold surface and the molds were placed in a circulating air oven at 60° C. for 1½ hours. The molds were then cooled and opened.

Lenses free from defects having a diameter of 7.9 mm, central thickness of 0.10±0.02 mm, central posterior radii of curvature of 7.47±0.4 mm and optical power in the range of −7.50 to −8.50 diopters were obtained.

These lenses exhibited superior resistance to warpage and could be flexed without permanent deformation as opposed to lenses of the same dimensions fabricated from non-cross linked polymethyl methacrylate.

EXAMPLE 3(a) Formation of Molds

Using the metal molds of Example 1a, female and male thermoplastic molds were prepared using Nylon-11. Female concave nylon molds having an inside diameter of 12.0 mm and a central radius of curvature of 7.48±0.03 mm were obtained. Male nylon molds having an outside diameter of 11.8 mm and a central convex radius of curvature of 6.99±0.03 mm were obtained. The peripheral rim projected 0.14 mm from the edge of the curved surface and was less than 0.01 mm thick at its apex.

EXAMPLE 3(b) Formation of Lenses

A two part room temperature vulcanizable transparent methyl silicone liquid was mixed, and 0.4 cc of the mixture was placed in the upward facing concave female molds. The male molds were inserted to displace excess fluid and the molds were lightly pressed to ensure seating of the rim. Molds were placed in a circulating air oven at 135° C. for two hours.

After cooling the molds were opened and lenses measured. The center thickness was 0.22±0.02 mm, the edge thickness was 0.11±0.02 mm, and the optical power ranged from −2.00 to −2.50 diopters.

I claim:

1. A process of producing contact lenses which comprises the steps of:
   (a) charging a mixture comprising vulcanizable or polymerizable constituents to a first mold portion of a thermoplastic mold for producing a contact lens, said thermoplastic mold comprising:
      (i) a first mold portion including a first molding surface having a principal longitudinal axis, said first molding surface having a predetermined curvature to form a first surface of the desired contact lens;
      (ii) a second mold portion including a second molding surface having a principal longitudinal axis, said second molding surface having a predetermined curvature to form a second surface of the desired contact lens; and
      (iii) a flexible rim portion being attached circumferentially to, and integral with, one of said molding surfaces of one of said mold portions and having an axis common with the principal longitudinal axis of the mold portion to which it is attached;
   (b) closing the mold by placing the first mold portion and the second mold portion in alignment with each other such that the principal longitudinal axes of the mold portions coincide with each other and in a manner whereby the flexible rim portion is seated circumferentially on the opposite molding surface while retaining said mixture between said molding surfaces and said flexible rim portion to form a totally enclosed space; and
   (c) subjecting the resulting closed mold system to activating conditions for a period of time sufficient to effect the desired degree of vulcanization or polymerization of said mixture while causing the flexible rim portion to flex in a uniform manner with respect to the axis of said molding surface such that said mold portions approach each other during vulcanization or polymerization and;
   (d) recovering the resulting product having the shape of a contact lens.

2. The process of claim 1 wherein said rim portion is flexible inwardly towards the axis of said molding surface.

3. The process of claim 2 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

4. The process of claim 2 wherein said mixture comprises 2-hydroxyethyl methacrylate.

5. A process of producing hydrophilic contact lenses having a 3-dimensional cross-linked network which comprises the steps of:
   (a) charging a polymerizable mixture comprising hydrophilic monomer to the female portion of a thermoplastic mold for producing a contact lens, said thermoplastic mold comprising:

(i) a female portion including a first molding surface having a principal longitudinal axis, said first molding surface having a predetermined curvature to form a first surface of the desired contact lens, said female portion comprising a hollow cylindrical portion having an open upper end and a closed lower end;

(ii) a male portion including a substantially cylindrical support portion and a second molding surface having a principal longitudinal axis, said second molding surface having a predetermined curvatures to form a second surface of the desired contact lens; and (iii) a flexible rim portion attached circumferentially to, and integral with, one of said molding surfaces and having an axis common with the principal longitudinal axis of the mold portion to which it is attached;

(b) closing the mold by slidably engaging the cylindrical support portion of the male portion with the hollow cylindrical portion of the female portion to enable said flexible rim portion to be seated circumferentially on the opposite molding surface while retaining said mixture between said molding surfaces and said flexible rim portion to form a totally enclosed space;

(c) subjecting the closed mold system to activating conditions for polymerization and allowing said polymerizable mixture to contract during polymerization urging said molding surfaces towards each other and causing said rim portion to flex inwardly in a uniform manner towards the axis of said molding surface during such contraction; and (d) recovering the resulting polymeric hydrophilic product having the shape of a contact lens.

6. The process of claim 5 wherein said mixture comprises at least one hydrophilic acrylic monomer.

7. The process of claim 6 wherein said mixture comprises 2-hydroxyethyl methacrylate.

8. The process of claim 5 wherein said mixture comprieses N-vinylpyrrolidone.

9. The process of claim 5 wherein said mixture comprises an N-alkyl-substituted acrylamide or methacrylamide.

10. A process according to claim 5 wherein said mixture contains a major amount of ethylene glycol monomethacrylate.

11. A process according to claim 10 wherein said polymerization is effected in the presence of free radical initiators or radiation.

12. A process according to claim 11 wherein the polymerization conditions comprise temperatures in the range of 40° C. below to 10° C. above the heat distortion temperature at 66 psi fiber stress for the thermoplastic material of said mold.

13. A process according to claim 12 including applying external pressure to the mold during the polymerization step.

14. A process for producing contact lenses in a closed mold system from a polymerizable mixture which shrinks during polymerization which includes:

(i) a thermoplastic male portion including a substantially cylindrical support having a principal longitudinal axis and a first molding surface attached circumferentially to said cylindrical support, said molding surface having a predetermined curvature to form a first surface of the contact lens;

(ii) a thermoplastic female portion comprising a hollow cylindrical portion having principal longitudinal axis and having an open upper end and a closed lower end, the internal diameter of said female cylindrical portion being sufficiently greater than the external diameter of said male support portion to permit frictionless insertion of the male portion thereto, the female portion being circumferentially closed at the lower end thereof by a second molding surface having a pre-determined curvature to form a second surface of the contact lens; and (iii) an integral rim portion flexible inwardly towards the axis of the molding surfaces, said rim being attached circumferentially to, and integral with, one of said molding surfaces and having an axis common with the principal longitudinal axis of the mold portion to which it is attached;

said process including the sequential steps of:

A. charging a polymerizable mixture comprising hydrophilic monomer into the female portion of said mold;

B. aligning the male mold portion and the female mold portion so that the principal longitudinal axes of each of said mold portions coincide with each other and closing the mold by slidably engaging the cylindrical support portion of the male portion with the hollow cylindrical portion of the female portion and seating said flexible rim circumferentially on the opposite molding surface while retaining said polymerizable mixture between said molding surfaces and said flexible rim portion to form a totally enclosed space;

C. subjecting the closed mold to polymerization conditions causing said polymerizable mixture to contract during polymerization, thereby urging said molding surfaces towards each other and causing said rim portion to flex inwardly in a uniform manner during such contraction; and D. removing the thus molded contact lens from the mold.

15. A process according to claim 14 wherein external pressure is applied to the closed mold during polymerization step C.

16. A process according to claim 14 wherein any excess polymerizable mixture is squeezed out of said enclosed space as the male and female portions are engaged in step B.

17. A process according to claim 14 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

* * * * *